United States Patent [19]
Bouton et al.

[11] 3,834,235
[45] Sept. 10, 1974

[54] LIQUID AND SOLID SENSING DEVICE
[76] Inventors: Michael John Bouton, 2558 Interstate, Apt. E., Mesquite, Tex. 75149; Bob L. Sikes, 2433 Cardinal Ln., Garland, Tex. 75040
[22] Filed: Dec. 17, 1971
[21] Appl. No.: 209,078

[52] U.S. Cl. .............................. 73/293, 116/118 R
[51] Int. Cl. ............................................. G01f 23/28
[58] Field of Search ................... 73/293; 350/96 R; 116/118 R, 118 A

[56] References Cited
UNITED STATES PATENTS

| | | | |
|---|---|---|---|
| 2,468,833 | 5/1949 | Murphy | 350/96 R |
| 3,054,291 | 9/1962 | Landwer | 73/293 |
| 3,068,697 | 12/1962 | Carlson | 73/293 |
| 3,120,125 | 2/1964 | Vasel | 116/118 R |
| 3,533,657 | 10/1970 | Da Silva | 350/96 B |
| 3,535,933 | 10/1970 | Pliml | 350/96 R |
| 3,553,666 | 1/1971 | Melone | 73/293 |
| 3,648,521 | 3/1972 | Amendolia | 73/293 |

FOREIGN PATENTS OR APPLICATIONS

| | | | |
|---|---|---|---|
| 267,898 | 4/1968 | Austria | 73/293 |

*Primary Examiner*—Richard C. Queisser
*Assistant Examiner*—Denis E. Corr
*Attorney, Agent, or Firm*—Richards, Harris & Medlock

[57] ABSTRACT

Opto-electronic single point control is a unique concept which uses the combined principles of light reflection and light refraction to activate or deactivate an all solid state switching circuit. When 120 volts AC is supplied to the control circuitry, the light source is activated and projects a beam of light through a solid quartz or plastic probe. When the device is used to sense liquids, the probe end used for sensing is fashioned in a cone shape. The light transmitted through the probe is internally reflected back through the probe when it is in a gaseous atmosphere. When the end of the probe is subjected to liquid, the light which is transmitted down the probe is refracted out of the probe and into the liquid. Both the internal reflection and the refraction of the light is registered by a light sensitive component which is an integral part of the control circuitry. The presence and absence of light determines the condition of the control circuitry. It will either switch the control circuitry from an off (deactivated) position to an on (activated) position, or vice versa. The activated or deactivated condition of the control circuitry is determined by which model is used. For liquids, the model 100A is a normally open device that is activated when in contact with liquid. The 100B model is a normally closed device that is deactivated when in contact with liquid.

When the device is used as a solid sensor, the probe end is changed from a cone shape to a flat end. Light transmitted through the probe is projected out through the flat end. When the light strikes a solid (non-liquid object), the light is reflected back into the probe and energizes the light sensor. The light sensor in turn activates or deactivates the control circuitry. Activation or deactivation of the control circuitry is again dependent upon the model being used. The 100A solid sensor is a normally closed device which is deactivated when in proximity of a solid. The 100B solid sensor is a normally open device, activated when in proximity of a solid.

3 Claims, 12 Drawing Figures

LIQUID AND SOLID SENSING DEVICE

This invention relates to a liquid level and solid sensing device and more particularly to a light-sensitive device for sensing a liquid in a chamber and the presence of solids and/or granular material within a given proximity.

According to basic principles, light is directed into a light-transmitting media such as glass or plastic, one end of which is the liquid sensing point. When a particular beam of light reaches this sensing point, it will either be reflected or transmitted through the surrounding medium, depending on whether the beam of light is incident at an angle greater or less than the critical angle of incidence. For a typical effect of the beam of light, the light will be reflected when the light sensitive device is surrounded by gas and transmitted when surrounded by liquid. Light sensitive means, such as a photo-conductive cell or photo-transistor, placed near the light source, will receive the reflected light and cause an electric signal to be produced at the instant the light reaches the light sensitive means. The signal thus produced when coupled with the appropriate electronic measuring circuitry can be recorded or used for control, thereby accurately sensing and controlling the liquid. By the substitution, in configuration, of the light transmitting media, the same mechanical and electrical configuration can be used to sense and control solids or granular material.

Light sensitive liquid level and solid sensor previously produced have several disadvantages. For example, the large physical size and complexity of construction, the abundance of movable parts which cause short life and unreliability, small signal output and low signal-to-noise ratio when subjected to vibration, constructed of materials which are subject to corrosion by liquids to be sensed, and lack of up-to-date electronic technology in design of sensing and control circuitry add to the disadvantages of present day optical liquid level and solid sensors.

The device of this invention provides a light-sensitive liquid sensor which overcomes the disadvantages of previous liquid sensors with the addition of being able to sense solids with only a modification to the sensor (probe).

According to the device of this invention, a simple and small optical liquid sensor and solid material sensor is provided which gives a strong signal and high signal-to-noise ratio signal upon occurance of a liquid or solid material at the predetermined signal sensitive point. Utilizing a minimum of reliable and durable solid state components arranged in a compact manner an optical liquid sensor and solid material sensor is provided which exhibits a marked improvement over known liquid sensor and solid material sensors.

It is therefore, an object of this invention to provide an improved liquid sensor.

It is a further object of this invention to provide a liquid sensor wherein the source of light and the light sensitive measuring device are in a parallel path utilizing a single transparent probe.

It is another object of this invention to provide a liquid sensor that will function in a plurality of liquids with different indices of refraction yet require no adjustment necessary, to perform in these different liquids.

It is still another object of this invention to provide a liquid sensor which can be modified by changing the sensor probe where as the device will sense the presence of solids and/or granular materials.

It is another object of this invention to provide a liquid sensor which will function in most highly corrosive liquids and environments.

Other objects of this invention will become apparent from the following descriptions taken in connection with the accompanying drawings in which.

Prior to explanation of the device and its function and claims, a brief description of Snell's theoretical principles of light reflection and light refraction will be presented as an aid to understanding the total concept of the invention with respect to its intended purpose.

The operation of light transmission through a transparent media which has an index of refraction greater than one, is based on the principle of total internal reflection.

Figure 6:
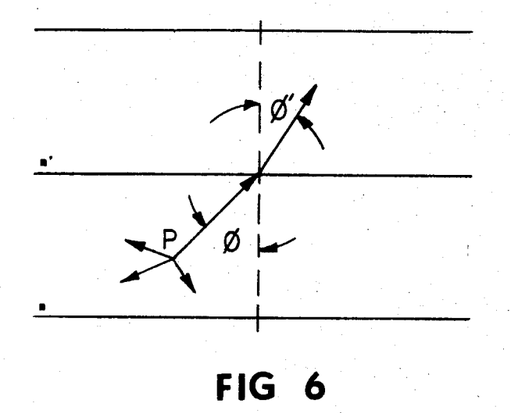
FIG. 6, 7 and 8 illustrates the operational principle of the device as it relates to Snell's law of internal reflection and refraction of light within a transparent media.

FIG. 6 shows an interface between two materials of different indices of refraction. Assume that the index of refraction, $n$, of the lower material is greater than that, $n'$, of the upper material. Point P represents a point source of light radiating uniformly in all directions. Some rays from P will be directed at the material interface.

At the interface, Snell's law requires:

$$n \sin \theta = n' \sin \theta',$$

where $\theta$ is the angle between a ray in the lower material and the normal to the interface, and $\theta$ is the angle between a refracted ray and the normal.

$$\sin \theta' = n/n' \sin \theta$$

By assumption, $n/n'$ is greater than one, so that $$\sin \theta' > \sin \theta$$

However since the maximum value of $\sin \theta'$ is one and occurs when $\theta'$ is 90°, $\theta'$ will reach 90° before $\theta$ does. That is for some value of $\theta$, defined as the critical angle, $\theta_c$, rays from P do not cross the interface.

When $\theta > \theta_c$, the rays are reflected entirely back into the lower material, or total internal reflection occurs.

Figure 7:
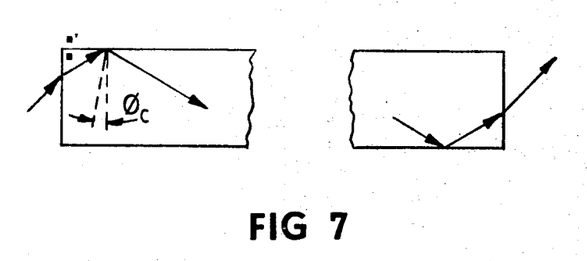

FIG. 7 illustrates the application of this principle to a transparent media and air. A transparent media of refractive index $n$ is surrounded by a layer of air (air having a lower refractive index), $n'$. A ray of light entering the end of the media will be refracted as shown. If, after refraction, it approaches the air interface at an angle greater than $\theta_c$, it will be reflected within the media. Since the angle of reflection must equal the angle of incidence, the ray will bounce down the media and emerge, refracted, at the exit end.

The numerical operatve, NA, of a light transmitting media is defined as the sin of half the angle of acceptance. Application of Snell's law at the interface for $\theta_c$, and again at the media end will give $$NA \equiv \sin \phi = \sqrt{n^2 - n'^2}$$

For total internal reflection to occur, a light ray must enter the media within half the angle $\phi$.

Application of Snell's law in conjunction with the principle of light refraction within a prism.

Figure 8:
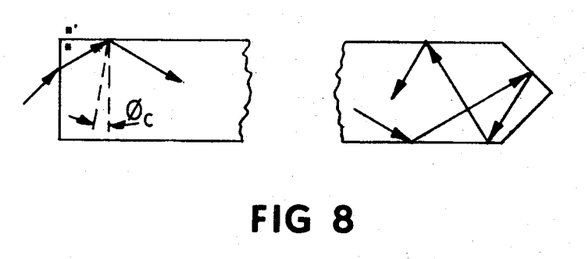

The light reflected within a transparent media as previously described may be confined and internally reflected back through the same transparent media, by adding a 45° prism at the exit end of the media. When the projected light strikes the prism, the light is internally reflected at 45° to its parallel surfaces. The reflection of light at 45°, causes the light to re-route its movement by a total of 180°, and move back in the same direction from which it came. (FIG. 8) Following again, Snell's law of internal reflection, the light continues back through the transparent media, until it is refracted out, or until the index of refraction of its parallel sides becomes greater than the index of refraction of the transparent media itself.

Figure 9:
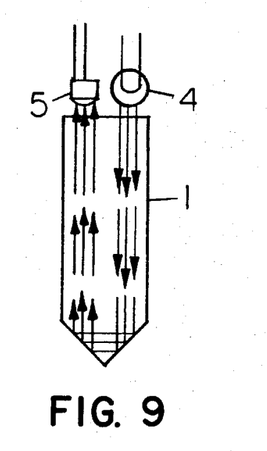
FIG. 9 is a schematic diagram, illustrating the operation of the liquid sensor when in a gaseious atmosphere.
Figure 10:
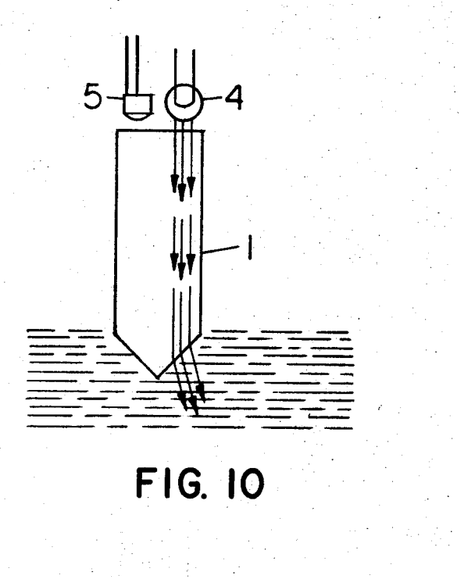
FIG. 10 illustrates the operation of the liquid sensor when exposed to a liquid environment.

The light source 4 transmits a beam of light through a transparent media referred to as a probe 1. The probe 1 is constructed of ⅜ inch dia. acrylic rod or 9 mm dia. quartz rod and has been machined at both ends. The end of the probe 1 which is used to contact the fluid has a 45° ± 1° machined and polished surface which forms a prism at end A. End B of the probe 1 is machined flat and polished and is placed next to the light source and light sensor. Following the principle as previously described; light is transmitted from the light source 4 through end B to end A. The prism at end A reflects the transmitted light back through the probe 1 to end B and is picked up by the light sensor 5. When the refractive index of the medium surrounding the probe (such as air) is less than the reflective index of the probe 1 material, the above mentioned internal reflection occurs. If end A of the probe 1 is in contact with liquid that has an index of refraction greater than the probe material, then the light is refracted out into the liquid rather than reflected back to the light sensor 5. (Refer to FIG. 9 and 10)

Figure 3:
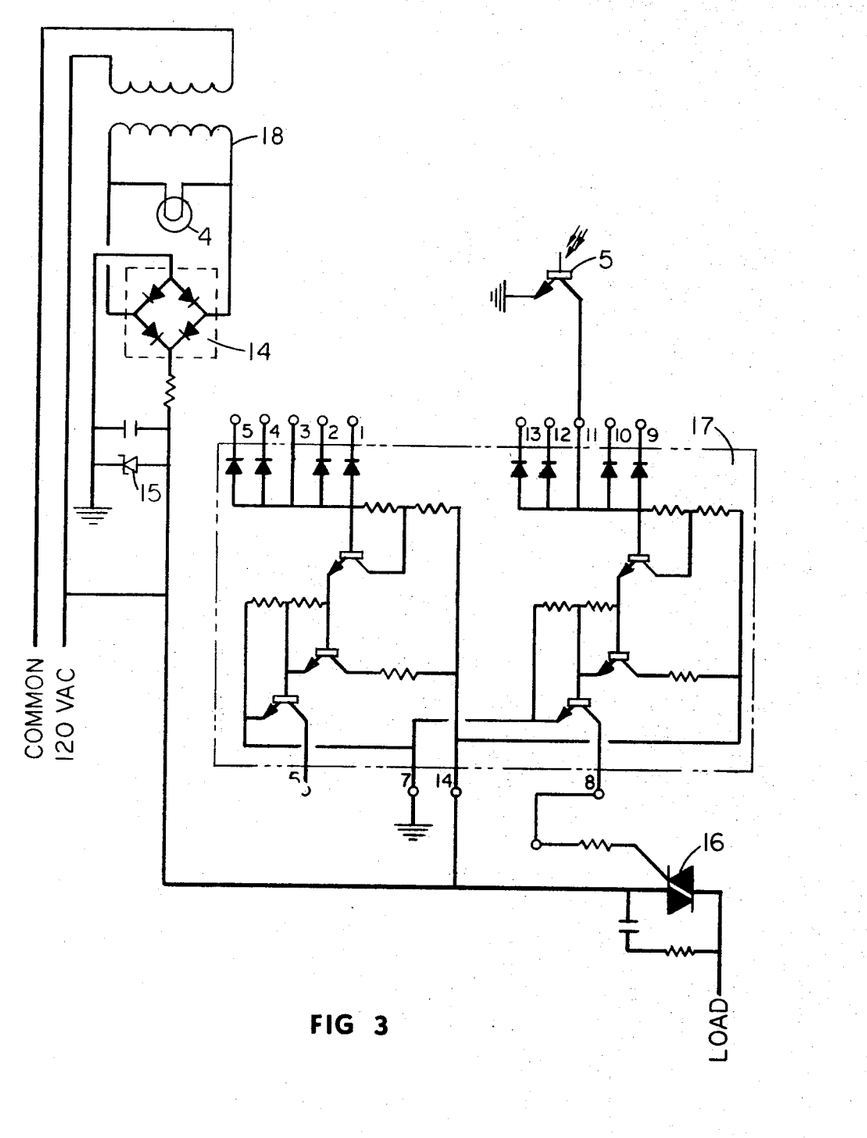
FIG. 3 illustrates the schematic of the electrical components as they are arranged for a 120 VAC signal if light is present on the light sensitive means.
Figure 4:
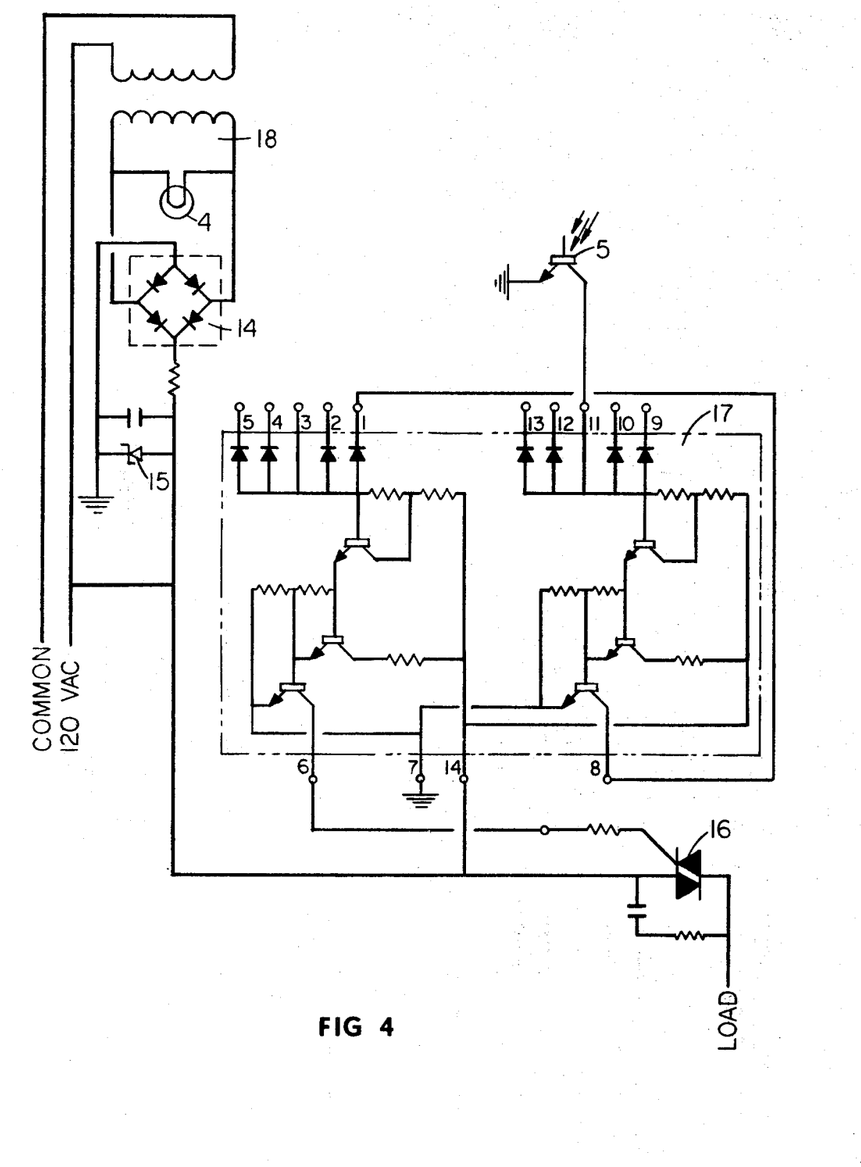
FIG. 4 illustrates the schematic of the electrical components as they are arranged for a no voltage signal if light is not present on the light sensitive means.

FIG. 3 and 4 illustrates the electrical schematic of the device. The input voltage (120 VAC) is supplied to the transformer which reduces the voltage to 10 VAC. This reduced voltage is used to activate the light source 4. Component 14 which is a full wave bridge rectifier changes the 10 VAC to 10 VDC and reduces the power to 4.5 VDC. This reduced voltage is used to operate the triac 16 integrated circuit 17 and the light sensing photo transistor 5. A Zener Diode 15 is designed into the circuit as a protective device to eliminate voltage and current overloads.

When light contacts the photo-transistor 5 a signal is generated to pin 11 of the integrated circuit 17 which is inverted and routed to pin 8 of the integrated circuit 17. The inverted signal is routed from pin 8 component 17 to the input side of the triac 16 (semi-conductor switch) as illustrated in FIG. 3. When the circuit is wired in this manner, the device is denoted as a normally off and the triac 16 is closed when light strikes the photo transistor 5. When light is removed from the photo transistor 5 (example: The probe is contacted by liquid and light is refracted out of the probe 1) the triac 16 moves to the open position.

In the normally on version (FIG. 4), pin 8 of the integrated circuit 17 is connected to pin 1 of component 17, and pin 6 of component 17 is connected to the input side of the triac 16. When light contacts the photo transistor, the triac 16 reverts to the open position. When light is removed from component 5, the triac 16 reverts to the closed position.

Figure 5:
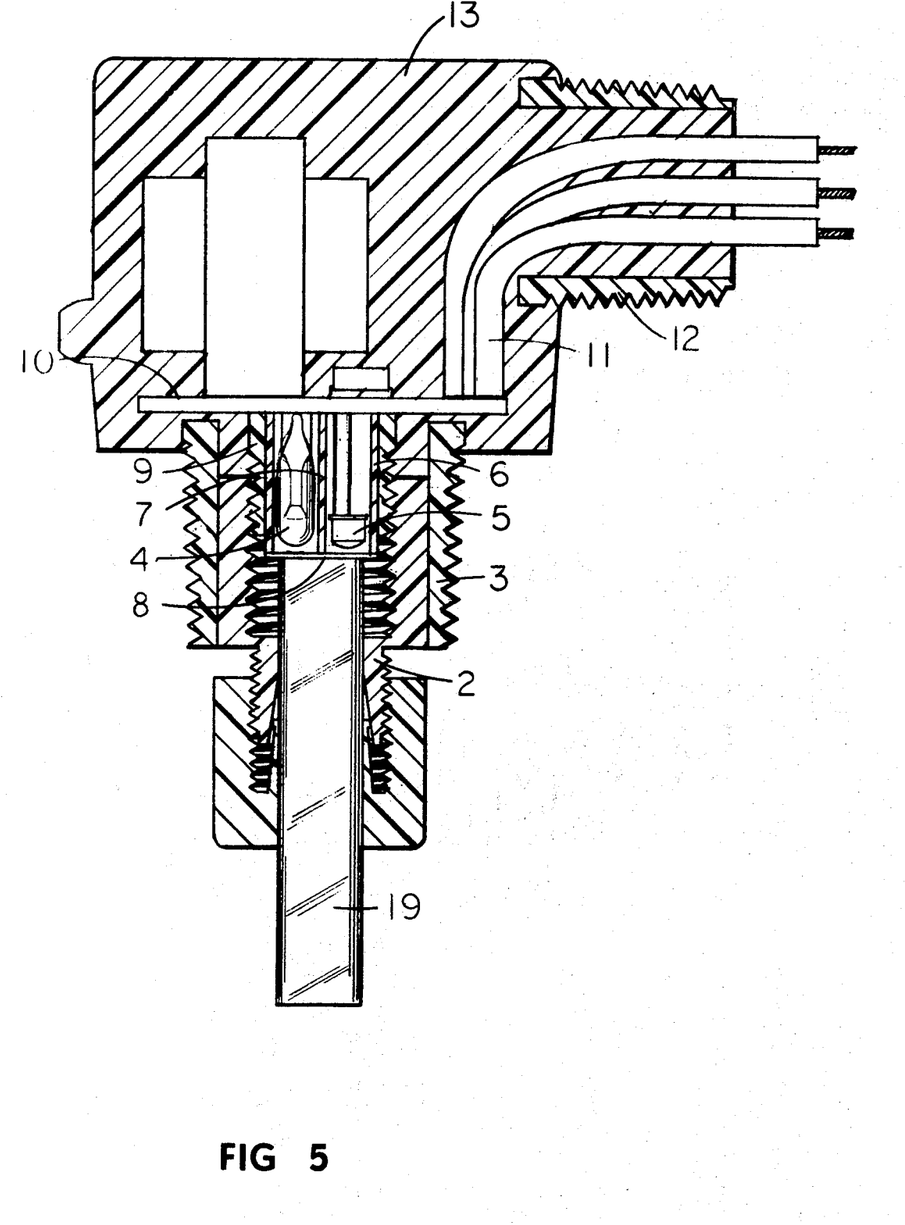
Figure 11:
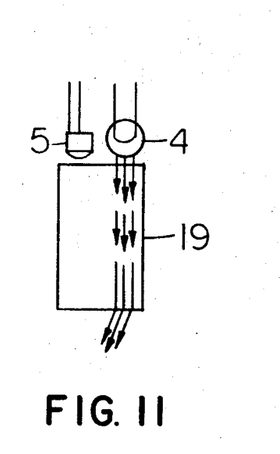
FIG. 11 illustrates the device as used as a solid sensor, with no solid present.
Figure 12:
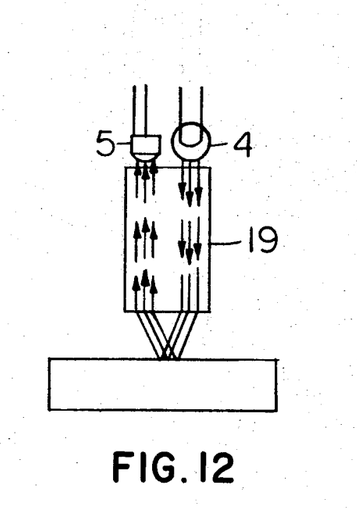
FIG. 12 illustrates the device in operation as it senses solids.

The device as previously described may also be used to sense solid or granulated material by a simple change in probe configuration. The probe configuration for sensing solids (FIG. 5) is basically the same as for liquids with the exception that both ends of the probe are machined flat, to provide a tube for the light to be transmitted through as well as received. The light from the light source 4 is transmitted down the probe 19 and through the end of the probe 19. When this light strikes a solid reflective surface, the light in turn, is reflected back through the flat end of the probe 19 to the light sensor 4. When the light sensor registers the presence of light, it activates the solid state switching circuit 17. (Refer to FIG. 11 and 12)

An acrylic or quartz probe 1 (FIG. 1), 19 (FIG. 5) is removable by loosening the clinch nut of a modified tubing connector, 2 manufactured by Jaco Manufacturing Co., which is heat welded into a polypropylene nipple 3. The clinch nut thus comprises a releasable locking means for the probe. A light source 4 and light sensor 5 are located at the flat end of the probe 1. They are encased in a 7/16 inch I.D. high pressure laminated plastic tube 6 with a high pressure laminated plastic divider 7 between the light source 4 and the light sensor 5 and this assembly is sealed with, and separated from the probe 1 (FIG. 1), 19 (FIG. 5) by a clear plastic lens 8. This is an added safety feature to protect the components from moisture.

Figure 1:
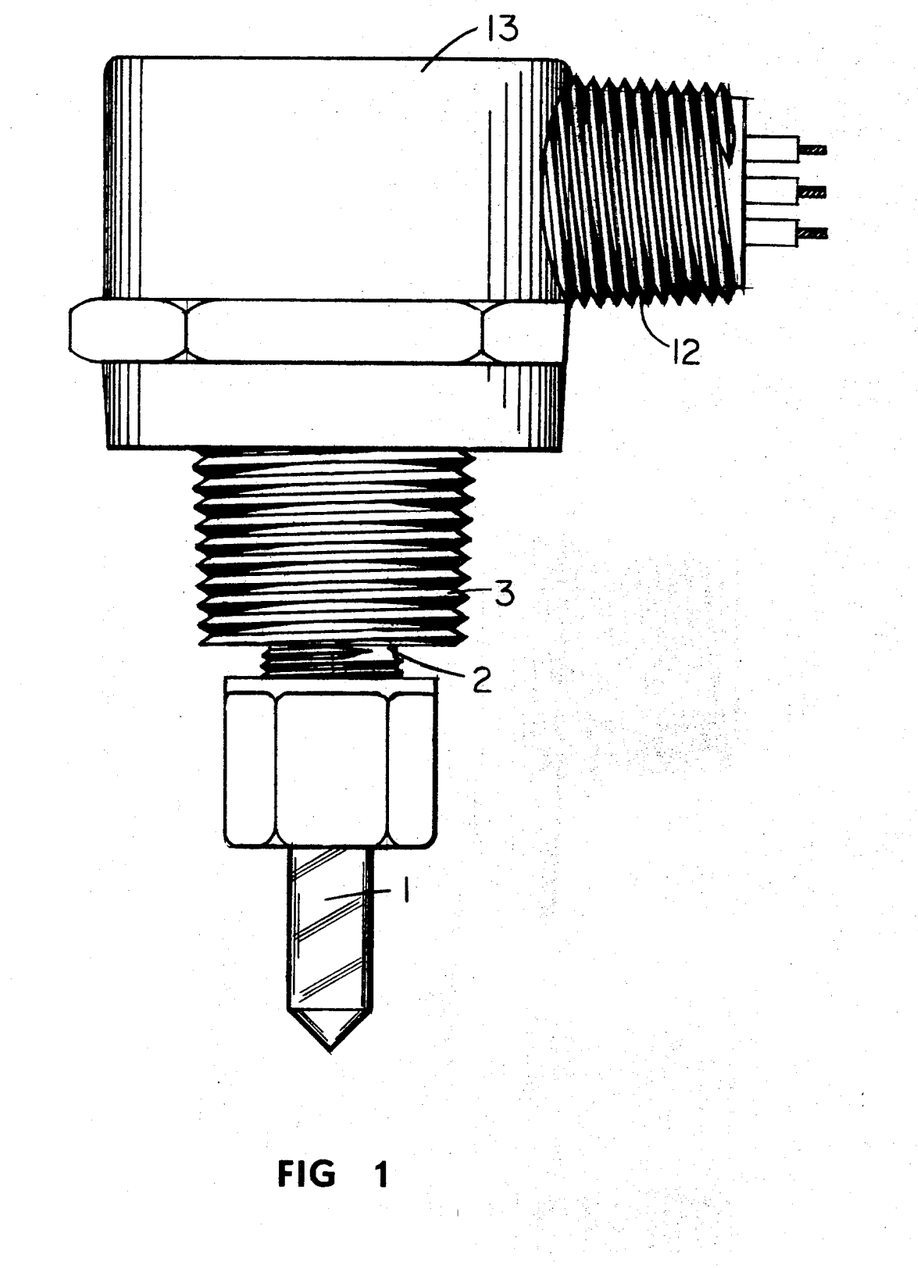
FIG. 1 is a plan view of the exterior of a device constructed in accordance with the invention.
Figure 2:
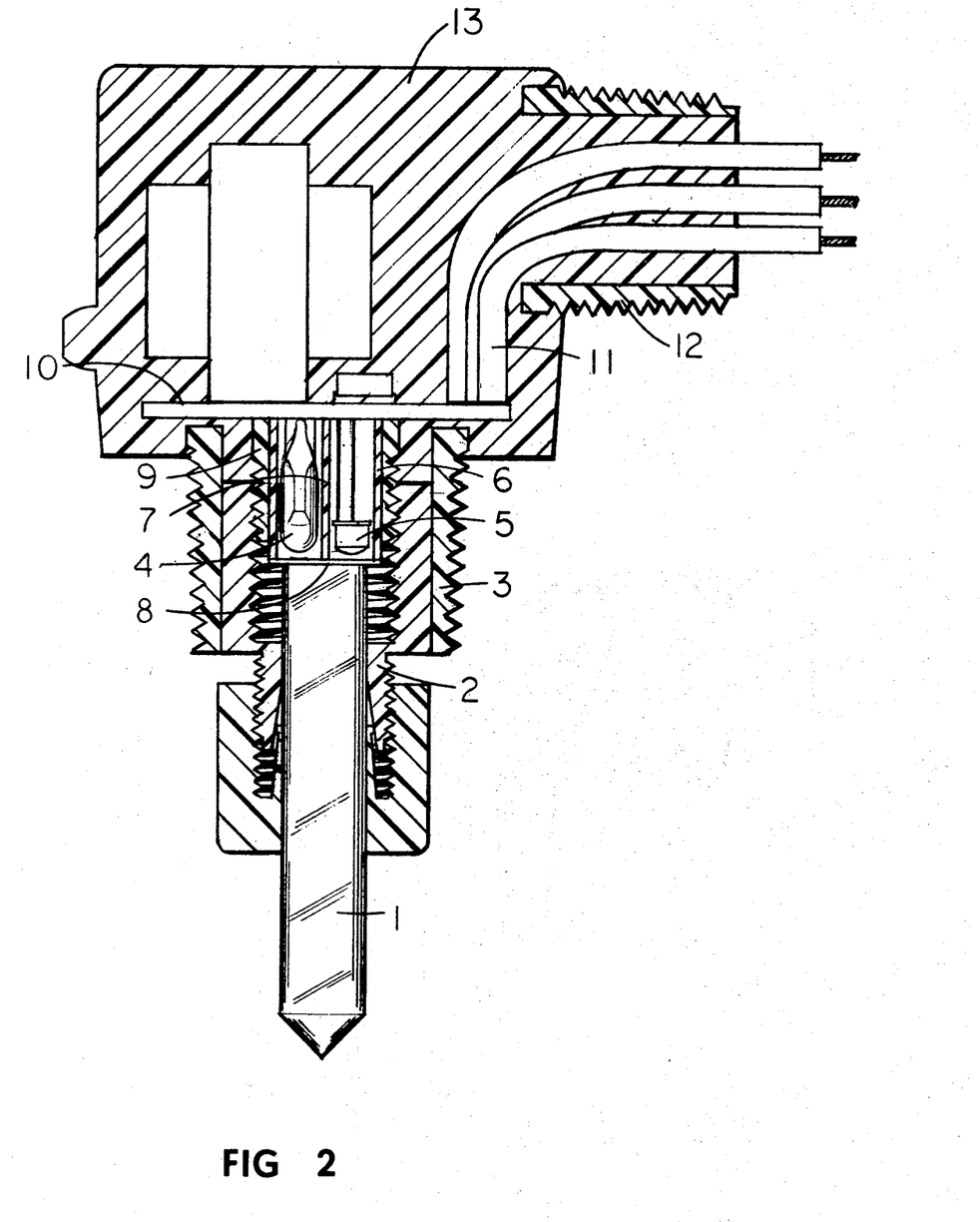
FIG. 2 and FIG. 5 are sectional views of the preferred embodiment of the invention.

This light source 4 and light sensor 5 assembly is glued inside of a ⅜ inch plastic nipple 9 that is drilled for a press fit. This nipple assembly is then screwed into the ⅜ inch female pipe threads of the Jaco fitting 2.

The electronic components, as designated in the schematics of FIGS. 3 and 4, are mounted to the circuit board 10. The plastic nipple 9 is then glued to the bottom side of the circuit board assembly 10. The electrical leads 11 are mounted to the top of the circuit board and are routed through a ¾ inch polyethylene nipple 12.

All of the above components and assemblies numbered 2 through 12 are placed into a mold and the outside case 13 is poured. The material used is a polyester and it serves three specific purposes. The first is to bond various parts together, the second as a potting compound for the electronic circuitry (components) and the third to provide an external case that is highly corrosion ressistant. As shown in FIG. 1, the case 13, nipple 3 and connector 2 provide a housing for the device.

The polypropylene nipple 3 is threaded so as to provide a mechanical means of installing the device in tanks, pipes, brackets and etc.

Although the invention has been described and illustrated in detail, it is to be clearly understood that the same is by way of illustration an example only and is not to be taken by way of limitation, the spirit and scope of this invention being limited only by the terms of the appended claims.

I claim:

1. A device for sensing the presence of materials comprising:
    a housing having a probe cavity;
    an elongate light transmitting probe having a first end releasably secured in the probe cavity and an opposite end extending outside the housing;
    a light source in the housing adjacent the first end of the probe;
    a light sensor in the housing adjacent the first end of the probe, the sensor being oriented to sense light from the light source reflected by the said opposite end of the probe; and
    locking means releasably securing the probe in the probe cavity of the housing, and adapted to being unlocked whereby the probe may be removed and replaced.

2. The device of claim 1, further comprising:
    electronic circuit means mounted in the housing for switching in response to varied responses by the light sensor; and
    sealing means sealing the light source, light sensor and electronic circuit means inside the housing and sealing them off from the probe cavity.

3. A liquid level sensing device comprising:
    a housing;
    a light conducting probe having a first end removably secured in the housing and its opposite end extending outside the housing, said opposite end being conical in shape;
    a light source in said housing adjacent the first end of the probe;
    a photoelectric sensor in said housing adjacent the first end of the probe;
    electronic circuitry in said housing for performing switching in response to the sensor;
    releasable locking means for retaining the probe in the housing, and adapted to being released to permit removal of the probe from the housing; and
    sealing means effecting a seal of the light source, photoelectric sensor and electronic circuitry in said housing.

* * * * *

UNITED STATES PATENT OFFICE
CERTIFICATE OF CORRECTION

Patent No. 3,834,235          Dated  September 10, 1974

Inventor(s) Michael John Bouton et al.

It is certified that error appears in the above-identified patent and that said Letters Patent are hereby corrected as shown below:

Column 4, line 26, "4" should read -- 5 --.

Signed and sealed this 12th day of November 1974.

(SEAL)
Attest:

McCOY M. GIBSON JR.
Attesting Officer

C. MARSHALL DANN
Commissioner of Patents